(12) United States Patent
Kataoka et al.

(10) Patent No.: US 11,167,790 B2
(45) Date of Patent: Nov. 9, 2021

(54) STEERING CONTROL DEVICE

(71) Applicant: JTEKT CORPORATION, Osaka (JP)

(72) Inventors: Nobuaki Kataoka, Okazaki (JP);
Takahiro Toko, Takahama (JP);
Takafumi Yamaguchi, Kuwana (JP);
Yukinobu Ezaki, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/013,957

(22) Filed: Sep. 8, 2020

(65) Prior Publication Data

US 2021/0070352 A1    Mar. 11, 2021

(30) Foreign Application Priority Data

Sep. 10, 2019    (JP) .............................. JP2019-164432

(51) Int. Cl.
    *B62D 5/04*    (2006.01)
    *B62D 15/02*   (2006.01)
    *B62D 6/02*    (2006.01)
(52) U.S. Cl.
    CPC ......... *B62D 5/0469* (2013.01); *B62D 5/0481* (2013.01); *B62D 6/02* (2013.01); *B62D 15/0215* (2013.01)
(58) Field of Classification Search
    CPC ...... B62D 5/0469; B62D 5/0481; B62D 6/02; B62D 15/0215
    See application file for complete search history.

(56) References Cited

U.S. PATENT DOCUMENTS

| | | |
|---|---|---|
| 2004/0098180 A1 | 5/2004 | Von Hammel et al. |
| 2018/0079447 A1 | 3/2018 | Yamashita et al. |
| 2018/0194389 A1 | 7/2018 | Imamura |

FOREIGN PATENT DOCUMENTS

| | | |
|---|---|---|
| DE | 102005038390 A1 | 6/2006 |
| DE | 102012004503 A1 | 9/2013 |
| EP | 0325148 A2 | 7/1989 |
| EP | 3170720 A1 | 5/2017 |
| JP | 2015-020506 A | 2/2015 |
| JP | 5962881 B1 | 8/2016 |
| WO | 02/081288 A2 | 10/2002 |

OTHER PUBLICATIONS

Feb. 2, 2021 Search Report issued in European Patent Application No. 20194101.0.

*Primary Examiner* — Mathew Franklin Gordon
(74) *Attorney, Agent, or Firm* — Oliff PLC (57) ABSTRACT

A steering control device includes a control circuit that controls a steering device. The control circuit is configured to execute an end-abutting relaxation control to correct a current command value such that decrease in an end interval angle is restricted, when the end interval angle is equal to or smaller than a predetermined angle, the end interval angle indicating the distance of an absolute steer angle from an end position correspondence angle. The control circuit is configured to perform a slewing intention determination of whether it is intended to perform the slewing travel of a vehicle during the execution of the end-abutting relaxation control. The control circuit is configured to perform a partial release control to reduce a correction amount of the current command value in the execution of the end-abutting relaxation control when it is determined that it is intended to perform the slewing travel of the vehicle.

9 Claims, 5 Drawing Sheets

STEERING CONTROL DEVICE

CROSS-REFERENCE TO RELATED APPLICATION

This application claims priority to Japanese Patent Application No. 2019-164432 filed on Sep. 10, 2019, incorporated herein by reference in its entirety.

BACKGROUND

1. Technical Field

The present disclosure relates to a steering control device.

2. Description of Related Art

As a vehicle steering device, an electric power steering device (EPS) including an actuator that uses a motor as a drive source is known. Some kinds of EPSs acquire the steering angle of a steering wheel as an absolute value having a range beyond 360°, and perform various controls based on the steering angle. As an example of the controls, Japanese Unexamined Patent Application Publication No. 2015-20506 (JP 2015-20506 A) and Japanese Patent No. 5962881 disclose EPSs each of which executes an end-abutting relaxation control for relaxing impact of so-called end abutting in which a rack end that is an end portion of a rack shaft abuts on a rack housing, for example. The EPS in JP 2015-20506 A relaxes the impact of the end abutting, by correcting a current command value corresponding to a target value of motor torque to be output by a motor, using a steering reaction component based on the steering angle. The EPS in Japanese Patent No. 5962881 relaxes the impact of the end abutting, by limiting the current command value corresponding to the target value of the motor torque to be output by the motor, to a value that is equal to or smaller than a limit value based on the steering angle.

SUMMARY

In the above configurations, due to the execution of the end-abutting relaxation control, movement of the rack shaft is sometimes restricted at a virtual rack end position on a steering neutral position side of an actual rack end position where the rack shaft actually abuts on the rack housing. In this case, the steering angle is smaller than in the case where the rack shaft is at the actual rack end position. That is, the minimum slewing radius in the case where the movement of the rack shaft is restricted at the virtual rack end position is larger than the minimum slewing radius based on the structure of the vehicle. Accordingly, at the time of slewing travel of the vehicle, the small-slewing performance of the vehicle can decrease due to the execution of the end-abutting relaxation control.

The present disclosure provides a steering control device that makes it possible to restrain the decrease in the small-slewing performance of the vehicle.

A steering control device according to an aspect of the present disclosure includes a control circuit that controls a steering device, the steering device including a housing, a turning shaft contained in the housing so as to be capable of reciprocating, and an actuator configured to give motor torque by which the turning shaft reciprocates using a motor as a drive source. The control circuit is configured to detect an absolute steer angle that is indicated by an absolute angle having a range beyond 360°, the absolute steer angle being the rotation angle of a rotation shaft and being capable of being converted into the turning angle of a turning wheel that is coupled to the turning shaft. The control circuit is configured to compute a current command value corresponding to a target value of the motor torque to be output by the motor. The control circuit is configured to control driving of the motor such that the actual current value of electric current to be supplied to the motor becomes the current command value. The control circuit is configured to store an end position correspondence angle associated with the absolute steer angle, the end position correspondence angle being an angle indicating an end position where movement of the turning shaft is restricted by end abutting in which the turning shaft abuts on the housing. The control circuit is configured to execute an end-abutting relaxation control to correct the current command value such that decrease in an end interval angle is restricted, when the end interval angle is equal to or smaller than a predetermined angle, the end interval angle indicating the distance of the absolute steer angle from the end position correspondence angle. The control circuit is configured to perform a slewing intention determination of whether it is intended to perform slewing travel of a vehicle during the execution of the end-abutting relaxation control, and is configured to perform a partial release control to reduce a correction amount of the current command value in the execution of the end-abutting relaxation control when it is determined that it is intended to perform the slewing travel of the vehicle.

With the steering control device according to the aspect of the present disclosure, when it is determined that a driver has a slewing intention to perform the slewing travel of the vehicle during the execution of the end-abutting relaxation control, the correction amount for correcting the current command value by the execution of the partial release control decreases. Thereby, the limitation of the current command value by the execution of the end-abutting relaxation control is partially released, and the current command value increases. Accordingly, for example, even when the movement of the turning shaft is restricted at a virtual end position due to the execution of the end-abutting relaxation control, the partial release control is executed and the current command value increases because of the driver's intention to perform the slewing travel. Therefore, it is possible to move the turning shaft to an actual end position. As a result, it is possible to restrain the decrease in the small-slewing performance of the vehicle.

In the steering control device according to the aspect of the present disclosure, the control circuit may be configured to compute a steer angle limit value that decreases based on the decrease in the end interval angle, when the end interval angle is equal to or smaller than the predetermined angle. The control circuit may be configured to set a limit value that is an upper limit of the absolute value of the current command value, to a value that is equal to or smaller than the steer angle limit value. The control circuit may be configured to execute the end-abutting relaxation control by limiting the absolute value of the current command value to the steer angle limit value. The control circuit may be configured to compute the steer angle limit value based on a value resulting from subtracting an angle limit component from a rated current of the motor, the angle limit component being based on the end interval angle. The control circuit may be configured to execute the partial release control by reducing the angle limit component.

With the steering control device according to the aspect of the present disclosure, in the configuration of executing the end-abutting relaxation control in a manner in which the current command value is limited to the value that is equal to or smaller than the steer angle limit value, it is possible to easily execute the partial release control to reduce the correction amount of the current command value by reducing the angle limit component that is a base of the steer angle limit value.

In the steering control device according to the aspect of the present disclosure, a condition for satisfaction of the slewing intention determination may include a condition that the angle limit component is larger than a current threshold that is set based on the rated current, and a condition that a steering torque to be input to the steering device is equal to or larger than a steering torque threshold indicating a torque necessary for the slewing travel of the vehicle.

In the steering control device according to the aspect of the present disclosure, the condition for the satisfaction of the slewing intention determination may include a condition that a vehicle speed is in a predetermined vehicle speed range indicating a low speed range. In the steering control device according to the aspect of the present disclosure, the condition for the satisfaction of the slewing intention determination may include at least one of a condition that the angular velocity of the motor is equal to or lower than an angular velocity threshold indicating a stop state of the motor and a condition that the angular velocity change amount of the motor is smaller than an angular velocity change amount threshold indicating the stop state of the motor.

In the steering control device according to the aspect of the present disclosure, the control circuit may be configured to determine that it is intended to perform the slewing travel of the vehicle, when the slewing intention determination is continuously satisfied for a predetermined time. With the steering control device according to the aspect of the present disclosure, it is possible to more exactly determine a situation in which the driver intends to perform the slewing travel in the state where the movement of the turning shaft is restricted at the virtual end position due to the execution of the end-abutting relaxation control.

In the steering control device according to the aspect of the present disclosure, the control circuit may be configured to linearly reduce the angle limit component, with time lapse from a start time of the partial release control. In the steering control device according to the aspect of the present disclosure, the control circuit may be configured to reduce the absolute value of the change rate of the angle limit component and reduce the angle limit component, with time lapse from a start time of the partial release control, the change rate of the angle limit component being a change rate with respect to the time lapse.

With the steering control device according to the aspect of the present disclosure, it is possible to suitably reduce the angle limit component, that is, to suitably increase the steer angle limit value, and furthermore it is possible to suitably increase the current command value. Thereby, for example, even when the turning shaft is moved by the execution of the partial release control and the end abutting occurs, it is possible to restrain a great load from being given to the steering device at the time of the end abutting.

In the steering control device according to the aspect of the present disclosure, the control circuit may be configured to reduce the angle limit component until the angle limit component becomes a preset release target value, during the execution of the partial release control. The control circuit may be configured to stop the partial release control when the angle limit component before the reduction by the execution of the partial release control is smaller than the release target value.

With the steering control device according to the aspect of the present disclosure, the partial release control is stopped when a return steering is performed after the execution of the partial release control and the angle limit component before the reduction by the execution of the partial release control becomes smaller than the release target value. Therefore, for example, unlike the case of stopping the partial release control in a state where the angle limit component before the reduction by the execution of the partial release control is equal to or larger than the release target value, it is possible to prevent the steer angle limit value, that is, the current command value from changing suddenly, and to restrain a steering feeling from being worsened.

With the steering control device according to the aspect of the present disclosure, it is possible to restrain the decrease in the small-slewing performance of the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
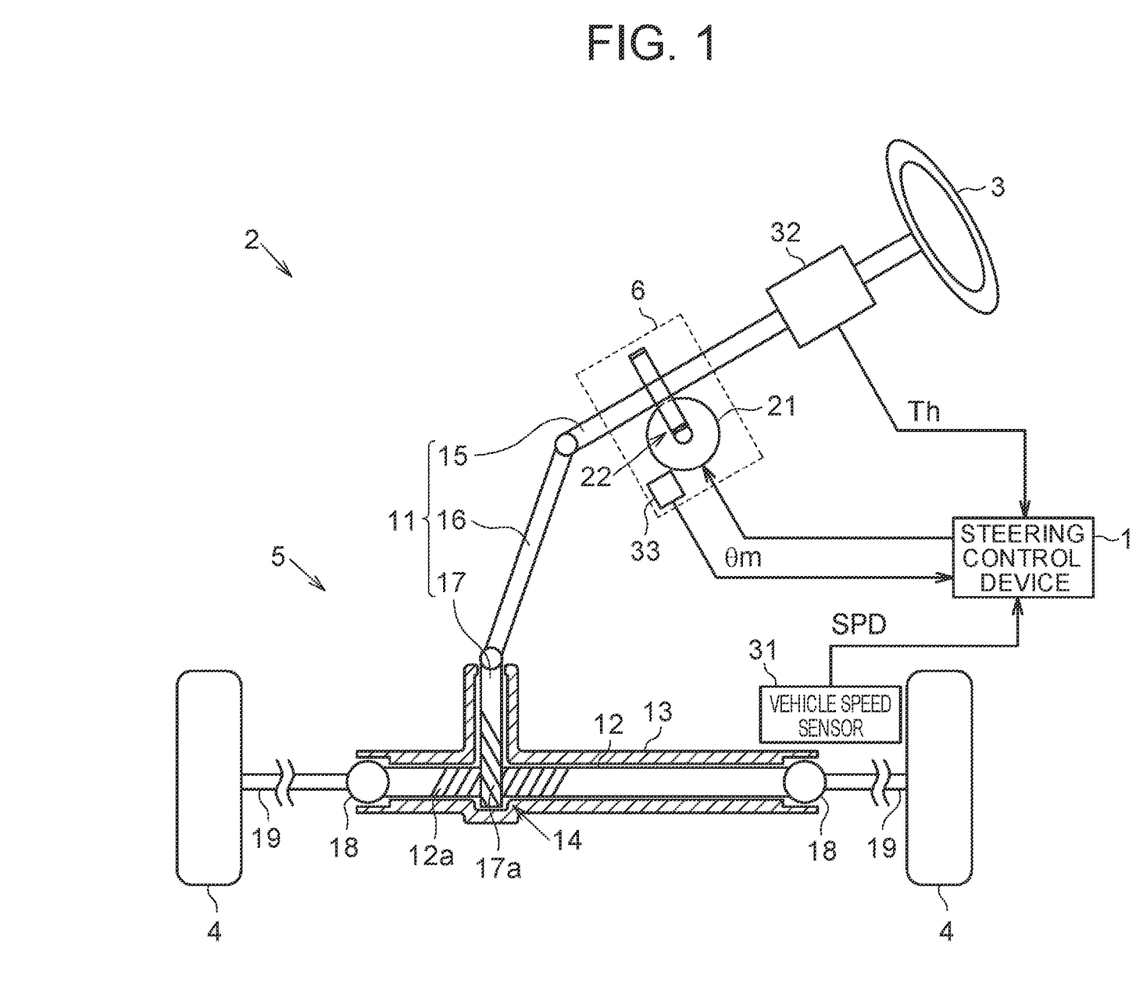
FIG. 1 is a schematic diagram of an electric power steering device in an embodiment.

An embodiment of a steering control device will be described below with reference to the drawings. As shown in FIG. 1, an electric power steering device (EPS) 2 as a steering device that is controlled by a steering control device 1 includes a steering mechanism 5 that turns turning wheels 4 based on operation of a steering wheel 3 by a driver. The EPS 2 includes an EPS actuator 6 as an actuator that gives assist force for assisting steering operation, to the steering mechanism 5.

The steering mechanism 5 includes a steering shaft 11 to which a steering wheel 3 is fixed, a rack shaft 12 as a turning shaft that is coupled to the steering shaft 11, a rack housing 13 as a housing into which a rack shaft 12 is inserted so as to be capable of reciprocating, and a rack-and-pinion mechanism 14 that transforms rotation of the steering shaft 11 into movement of the rack shaft 12. The steering shaft 11 is constructed by coupling a column shaft 15, an intermediate shaft 16 and a pinion shaft 17 in order from the position of the steering wheel 3.

The rack shaft 12 and the pinion shaft 17 are disposed at a predetermined crossing angle in the rack housing 13. The rack-and-pinion mechanism 14 is constructed by engaging rack teeth 12a formed on the rack shaft 12 and pinion teeth 17a formed on the pinion shaft 17. Tie rods 19 are rotatably coupled to both ends of the rack shaft 12 through rack ends 18 each of which is constituted by a ball joint provided at an end portion of the rack shaft 12. Distal ends of the tie rods 19 are coupled to unillustrated knuckles to which the turning wheels 4 are attached. Accordingly, in the EPS 2, the rotation of the steering shaft 11 due to the steering operation is transformed into the axial movement of the rack shaft 12 by the rack-and-pinion mechanism 14, and the axial movement is transmitted to the knuckles through the tie rods 19, so that the turning angle of the turning wheels 4, that is, the running direction of the vehicle is changed.

A position of the rack shaft 12 where the rack end 18 abuts on the left end of the rack housing 13 is a position that allows a maximum rightward steering, and this position corresponds to a rack end position that is an end position on the right side. Further, a position of the rack shaft 12 where the rack end 18 abuts on the right end of the rack housing 13 is a position that allows a maximum leftward steering, and this position corresponds to a rack end position that is an end position on the left side.

The EPS actuator 6 includes a motor 21 that is a drive source, and a speed reducer 22 such as a worm and wheel mechanism. The motor 21 is coupled to the column shaft 15 through the speed reducer 22. The EPS actuator 6 reduces the speed of the rotation of the motor 21 with the speed reducer 22, and then transmits the rotation of the motor 21 to the column shaft 15. Thereby, the EPS actuator 6 gives motor torque to the steering mechanism 5 as the assist force. As the motor 21 in the embodiment, a three-phase brushless motor is employed.

The steering control device 1 is connected to the motor 21, and controls action of the motor 21. The steering control device 1 includes an unillustrated central processing unit (CPU) and an unillustrated memory, and the CPU executes programs stored in the memory in a predetermined computation cycle. Thereby, various controls are executed.

The steering control device 1 is connected to a vehicle speed sensor 31 that detects a vehicle speed SPD of the vehicle, and a torque sensor 32 that detects a steering torque Th given to the steering shaft 11 due to the steering by the driver. The steering control device 1 is connected to a rotation sensor 33 that detects a rotation angle θm of the motor 21 as a relative angle in a range of 360°. For example, the steering torque Th and the rotation angle θm are detected as positive values in the case of rightward steering, and are detected as negative values in the case of leftward steering. The steering control device 1 supplies drive electric power to the motor 21 based on signals that are input from the sensors and that indicate state quantities, and thereby controls the action of the EPS actuator 6, that is, the assist force that is given to the steering mechanism 5 for reciprocating the rack shaft 12.

Figure 2:
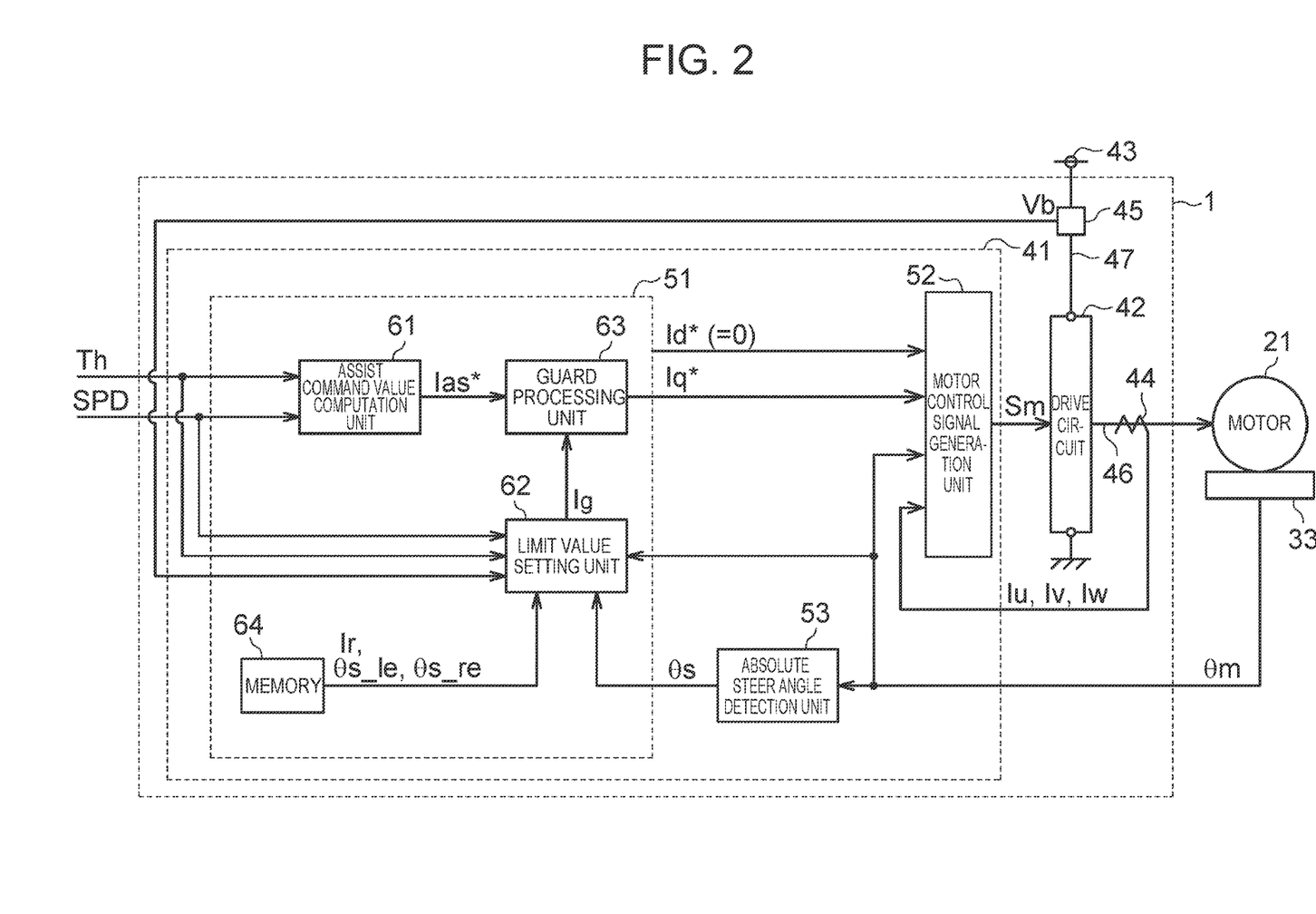
FIG. 2 is a block diagram of a steering control device in the embodiment.

Next, the configuration of the steering control device 1 will be descried. As shown in FIG. 2, the steering control device 1 includes a microcomputer 41 as a control circuit that outputs a motor control signal Sm, and a drive circuit 42 that supplies the drive electric power to the motor 21 based on the motor control signal Sm. As the drive circuit 42 in the embodiment, a well-known PWM inverter including a plurality of switching elements such as FETs is employed. The motor control signal Sm that is output by the microcomputer 41 specifies an on-state or off-state of each switching element. Thereby, in response to the motor control signal Sm, each switching element is turned on or off, and a pattern of energization to motor coils for the respective phases is switched, so that direct-current electric power of an in-vehicle electric source 43 is transformed into three-phase drive electric power and the three-phase drive electric power is output to the motor 21.

Control blocks described below are realized by computer programs that are executed by the microcomputer 41. The state quantities are detected in a predetermined sampling cycle, and computation processes indicated by the control blocks described below are executed in a predetermined computation cycle.

The microcomputer 41 receives the vehicle speed SPD, the steering torque Th, and the rotation angle θm of the motor 21. Further, the microcomputer 41 receives current values Iu, Iv, Iw in the respective phases of the motor 21, which are current values detected by current sensors 44, and a source voltage Vb of the in-vehicle electric source 43, which is a source voltage detected by a voltage sensor 45. The current sensors 44 are provided on connecting wires 46 between the drive circuit 42 and the motor coils for the respective phases. The voltage sensor 45 is provided on a connecting wire 47 between the in-vehicle electric source 43 and the drive circuit 42. In FIG. 2, for convenience of description, the current sensors 44 for the respective phases and the connecting wires 46 for the respective phases are illustrated as a single current sensor 44 and a single connecting wire 46, respectively. The microcomputer 41 outputs the motor control signal Sm based on the state quantities.

More specifically, the microcomputer 41 includes a current command value computation unit 51 that computes current command values Id*, Iq*, a motor control signal generation unit 52 that outputs the motor control signal Sm based on the current command values Id*, Iq*, and an absolute steer angle detection unit 53 that detects an absolute steer angle θs.

The current command value computation unit 51 receives the vehicle speed SPD, the steering torque Th, the rotation angle θm and the absolute steer angle θs. The current command value computation unit 51 computes current command values Id*, Iq* based on the state quantities. The current command values Id*, Iq* are target values of electric currents that should be supplied to the motor 21, and respectively indicate a current command value on a d-axis and a current command value on a q-axis in a d/q coordinate system. The q-axis current command value Iq* indicates a target value of the motor torque that is output by the motor 21. In the embodiment, the d-axis current command value Id* is basically fixed at zero. For example, the current command values Id*, Iq* are positive values in the case of assist of the rightward steering, and are negative values in the case of assist of the leftward steering.

The motor control signal generation unit 52 receives the current command values Id*, Iq*, the current values Iu, Iv, Iw in the respective phases, and the rotation angle θm of the motor 21. The motor control signal generation unit 52 generates the motor control signal Sm by executing a current feedback control in the d/q ωordinate system based on the state quantities.

Specifically, the motor control signal generation unit 52 computes a d-axis current value Id and a q-axis current value Iq that are actual current values of the motor 21 in the d/q ωordinate system, by mapping the current values Iu, Iv, Iw in the respective phases on the d/q ωordinate system based on the rotation angle θm. Then, the motor control signal generation unit 52 generates the motor control signal Sm, by performing the current feedback control such that the d-axis current value Id follows the d-axis current command value Id* and performing the current feedback control such that the q-axis current value Iq follows the q-axis current command value Iq*.

The motor control signal generation unit 52 outputs the motor control signal Sm generated in this way, to the drive circuit 42. Thereby, the drive electric power corresponding to the motor control signal Sm is supplied to the motor 21, and the motor torque corresponding to the q-axis current command value Iq* is output from the motor 21, so that the assist force is given to the steering mechanism 5.

The absolute steer angle detection unit 53 receives the rotation angle θm. The absolute steer angle detection unit 53 detects a motor absolute angle that is expressed as an absolute angle having a range beyond 360°, based on the rotation angle θm. The absolute steer angle detection unit 53 in the embodiment sets, as a starting point, the rotation angle θm when a start switch such as an ignition switch is turned on for the first time, for example, after replacement of the in-vehicle electric source 43, adds up the rotation number of the motor 21, and detects the motor absolute angle based on the rotation number and the rotation angle θm. The absolute steer angle detection unit 53 detects the absolute steer angle θs indicating the steering angle of the steering shaft 11, by multiplying the motor absolute angle by a conversion factor based on the reduction ratio of the speed reducer 22. The steering control device 1 in the embodiment monitors whether the motor 21 rotates, even while the start switch is in the off-state, and adds up the rotation number of the motor 21 at all times. Therefore, even when the start switch is turned on for the second time after the replacement of the in-vehicle electric source 43, the starting point of the absolute steer angle θs is the same as the starting point set when the start switch is turned on for the first time.

As described above, the turning angle of the turning wheel 4 is changed by the rotation of the steering shaft 11, and therefore the absolute steer angle θs indicates a rotation angle of a rotation shaft that is capable of being converted into the turning angle of the turning wheel 4. For example, the motor absolute angle and the absolute steer angle θs are positive values in the case of a rightward rotation angle with respect to the starting point, and are negative values in the case of a leftward rotation angle with respect to the starting point.

Next, the configuration of the current command value computation unit 51 will be described in detail. The current command value computation unit 51 includes an assist command value computation unit 61 that computes an assist command value Ias* that is a basic component of the q-axis current command value Iq*. Further, the current command value computation unit 51 includes a limit value setting unit 62 that sets a limit value Ig that is an upper limit of the absolute value of the q-axis current command value Iq*, and a guard processing unit 63 that limits the absolute value of the assist command value Ias* to a value that is equal to or smaller than the limit value Ig. The limit value setting unit 62 is connected to a memory 64.

The assist command value computation unit 61 receives the steering torque Th and the vehicle speed SPD. The assist command value computation unit 61 computes the assist command value Ias* based on the steering torque Th and the vehicle speed SPD. Specifically, the assist command value computation unit 61 computes the assist command value Ias* having a larger absolute value as the absolute value of the steering torque Th increases and the vehicle speed SPD decreases. The assist command value Ias* computed in this way is output to the guard processing unit 63.

In addition to the assist command value Ias*, the guard processing unit 63 receives the limit value Ig that is set in the limit value setting unit 62 as described later. When the absolute value of the input assist command value Ias* is equal to or smaller than the limit value Ig, the guard processing unit 63 outputs, as the q-axis current command value Iq*, the value of the assist command value Ias* with no change, to the motor control signal generation unit 52. On the other hand, when the absolute value of the input assist command value Ias* is larger than the limit value Ig, the guard processing unit 63 outputs, as the q-axis current command value Iq*, a value resulting from limiting the absolute value of the assist command value Ias* to the limit value Ig, to the motor control signal generation unit 52.

In the memory 64, a rated current Ir corresponding to a rated torque previously set as the motor torque that can be output by the motor 21, end position correspondence angles θs_le, θs_re, and the like are stored. The end position correspondence angle θs_le on the left side is the absolute steer angle θs corresponding to the rack end position on the left side, and the end position correspondence angle θs_re on the right side is the absolute steer angle θs corresponding to the rack end position on the right side. The end position correspondence angle θs_le, θs_re are set, for example, by a learning that is appropriately performed based on the steering by the driver.

Next, the configuration of the limit value setting unit 62 will be described. The limit value setting unit 62 receives the rotation angle θm, the absolute steer angle θs, the vehicle speed SPD, the steering torque Th, the source voltage Vb, the rated current Ir, and the end position correspondence angles θs_le, θs_re. The limit value setting unit 62 sets the limit value Ig based on the state quantities.

Figure 3:
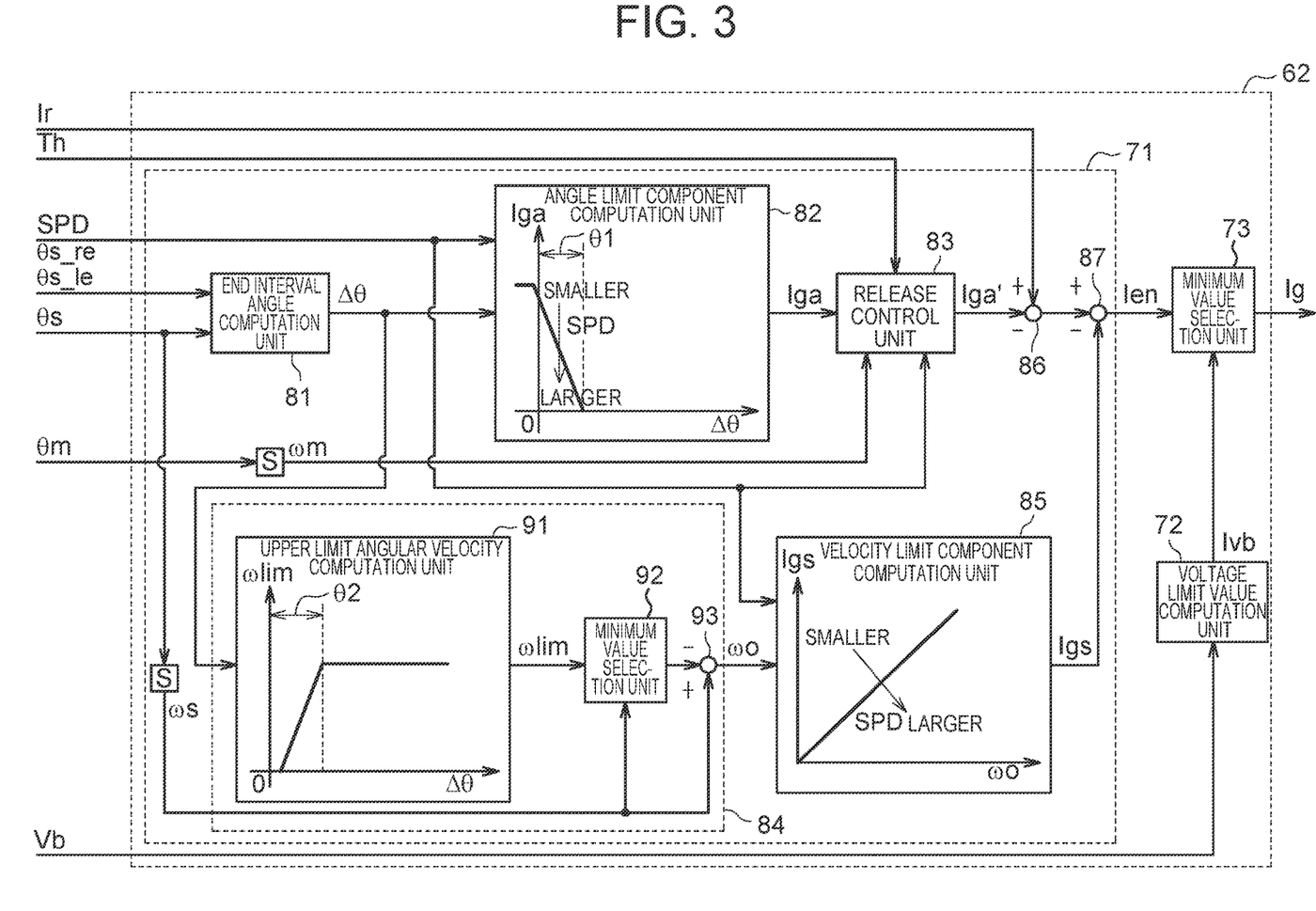
FIG. 3 is a block diagram of a limit value setting unit in the embodiment.

More specifically, as shown in FIG. 3, the limit value setting unit 62 includes a steer angle limit value computation unit 71 that computes the steer angle limit value Ien based on the absolute steer angle θs, a voltage limit value computation unit 72 that computes a voltage limit value Ivb as another limit value based on the source voltage Vb, and a minimum value selection unit 73 that selects the smaller one of the steer angle limit value Ien and the voltage limit value Ivb.

The steer angle limit value computation unit 71 receives the rotation angle θm, the absolute steer angle θs, the vehicle speed SPD, the steering torque Th, the rated current Ir, and the end position correspondence angles θs_le, θs_re. When an end interval angle Δθ indicating the distance of the absolute steer angle θs from the end position correspondence angle θs_le, θs_re is equal to or smaller than a predetermined angle θ1 as described later, based on the state quantities, the steer angle limit value computation unit 71 computes the steer angle limit value Ien that decreases based on decrease in the end interval angle Δθ. The steer angle limit value Ien computed in this way is output to the minimum value selection unit 73.

The voltage limit value computation unit 72 receives the source voltage Vb. When the absolute value of the source voltage Vb is equal to or smaller than a preset voltage threshold Vth, the voltage limit value computation unit 72 computes the voltage limit value Ivb that is smaller than a rated voltage for supplying the rated current Ir. Specifically, when the absolute value of the source voltage Vb is equal to or smaller than the voltage threshold Vth, the voltage limit value computation unit 72 computes the voltage limit value Ivb having a smaller absolute value based on the decrease in the absolute value of the source voltage Vb. The voltage limit value Ivb computed in this way is output to the minimum value selection unit 73.

The minimum value selection unit 73 selects, as the limit value Ig, the smaller one of the steer angle limit value Ien and voltage limit value Ivb that are input, and outputs the smaller one to the guard processing unit 63. In the case where the steer angle limit value Ien is output to the guard processing unit 63 as the limit value Ig, the absolute value of the q-axis current command value Iq* is limited to the steer angle limit value Ien. Thereby, when the end interval angle $\Delta\theta$ is equal to or smaller than the predetermined angle $\theta1$, the absolute value of the q-axis current command value Iq* decreases based on the decrease in the end interval angle $\Delta\theta$, so that an end-abutting relaxation control is executed. The end-abutting relaxation control relaxes impact of end abutting. That is, the current command value computation unit 51 in the embodiment corrects the q-axis current command value Iq* in a manner in which the absolute value of the q-axis current command value Iq* is limited to a value that is equal to or smaller than the limit value Ig. The correction amount of the q-axis current command value Iq* is an excess of the assist command value Ias* relative to the limit value Ig, that is, an excess relative to the steer angle limit value Ien.

In the case where the voltage limit value Ivb is output to the guard processing unit 63 as the limit value Ig, the absolute value of the q-axis current command value Iq* is limited to the voltage limit value Ivb. Thereby, when the absolute value of the source voltage Vb is equal to or smaller than the voltage threshold Vth, a source protection control is executed. By the source protection control, the absolute value of the q-axis current command value Iq* decreases based on the decrease in the absolute value of the source voltage Vb.

Next, the configuration of the steer angle limit value computation unit 71 will be described. The steer angle limit value computation unit 71 includes an end interval angle computation unit 81 that computes the end interval angle $\Delta\theta$, an angle limit component computation unit 82 that computes an angle limit component Iga that is a current limit amount decided depending on the end interval angle $\Delta\theta$, and a release control unit 83 that corrects the angle limit component Iga. Further, the steer angle limit value computation unit 71 includes an excess angular velocity computation unit 84 that computes an excess angular velocity $\omega$o that is an excess of a steering velocity $\omega$s relative to an upper limit angular velocity $\omega$lim, and a velocity limit component computation unit 85 that computes a velocity limit component Igs that is a current limit amount decided depending on the excess angular velocity $\omega$o.

The end interval angle computation unit 81 receives the absolute steer angle $\theta$s and the end position correspondence angles $\theta$s_le, $\theta$s_re. The end interval angle computation unit 81 computes the difference between the absolute steer angle $\theta$s in the last computation cycle and the end position correspondence angle $\theta$s_le on the left side and the difference between the absolute steer angle $\theta$s in the last computation cycle and the end position correspondence angle $\theta$s_re on the right side. Then, the end interval angle computation unit 81 outputs a difference that is of the computed differences and that is smaller in absolute value, to the angle limit component computation unit 82 and the excess angular velocity computation unit 84, as the end interval angle $\Delta\theta$.

The angle limit component computation unit 82 receives the end interval angle $\Delta\theta$ and the vehicle speed SPD. The angle limit component computation unit 82 includes a map deciding a relation of the end interval angle $\Delta\theta$, the vehicle speed SPD and the angle limit component Iga, and computes the angle limit component Iga corresponding to the end interval angle $\Delta\theta$ and the vehicle speed SPD, by referring to the map.

In the map, the angle limit component Iga is set so as to decrease in proportion to increase in the end interval angle $\Delta\theta$ from zero and to become zero when the end interval angle $\Delta\theta$ becomes larger than the predetermined angle $\theta1$. In the map, a region where the end interval angle $\Delta\theta$ is negative is also set. The angle limit component Iga increases in proportion to decrease in the end interval angle $\Delta\theta$ when the end interval angle $\Delta\theta$ is smaller than zero, and is constant after the angle limit component Iga becomes the same value as the rated current Ir. In the negative region of the map, the rotation of the motor 21 due to elastic deformation of the EPS 2 by further performing an additional steering in the state where the rack end 18 abuts on the rack housing 13 is considered. The predetermined angle $\theta1$ is set to a small angle indicating ranges of vicinities of the end position correspondence angles $\theta$s_le, $\theta$s_re. That is, the angle limit component Iga is set so as to be smaller as the absolute steer angle $\theta$s is closer to a steering neutral side with respect to the end position correspondence angles $\theta$s_le, $\theta$s_re, and to be zero when the absolute steer angle $\theta$s is on the steering neutral position side beyond the vicinities of the end position correspondence angles $\theta$s_le, $\theta$s_re.

Further, in the map, the angle limit component Iga is set so as to decrease based on increase in the vehicle speed SPD, in a region in which the end interval angle M is equal to or smaller than the predetermined angle $\theta1$. Specifically, in a region in which the vehicle speed SPD is in a low speed range, the angle limit component Iga is set so as to be larger than zero, and in a region in which the vehicle speed SPD is in a middle or high speed range, the angle limit component Iga is set so as to be zero.

The angle limit component Iga computed in this way is output to the release control unit 83. The release control unit 83 corrects the angle limit component Iga described later, and outputs an angle limit component Iga' after the correction, to a subtracter 86.

The excess angular velocity computation unit 84 receives the end interval angle $\Delta\theta$ and the steering velocity $\omega$s that is obtained by differentiating the absolute steer angle $\theta$s. The excess angular velocity computation unit 84 computes the excess angular velocity $\omega$o based on the state quantities.

More specifically, the excess angular velocity computation unit 84 includes an upper limit angular velocity computation unit 91 that computes the upper limit angular velocity $\omega$lim. The upper limit angular velocity computation unit 91 receives the end interval angle $\Delta\theta$. The upper limit angular velocity computation unit 91 includes a map deciding a relation of the end interval angle $\Delta\theta$ and the upper limit angular velocity $\omega$lim, and computes the upper limit angular velocity $\omega$lim corresponding to the end interval angle $\Delta\theta$, by referring to the map.

In the map, the upper limit angular velocity $\omega$lim is set such that the upper limit angular velocity $\omega$lim is lowest when the end interval angle $\Delta\theta$ is larger than zero but is close to zero and the upper limit angular velocity $\omega$lim increases in proportion to increase in the end interval angle $\Delta\theta$. Further, the upper limit angular velocity $\omega$lim is set so as to be kept at a value that is previously set as the maximum angular velocity at which the motor 21 can rotate, when the end interval angle $\Delta\theta$ is larger than a predetermined angle $\theta2$. The predetermined angle $\theta2$ is set to an angle that is larger than the above predetermined angle $\theta1$.

When the absolute value of the steering velocity ωs is higher than the upper limit angular velocity ωlim corresponding to the end interval angle Δθ, the excess angular velocity computation unit 84 outputs the excess of the steering velocity ωs relative to the upper limit angular velocity ωlim, to the velocity limit component computation unit 85, as the excess angular velocity ωo. On the other hand, when the absolute value of the steering velocity ωs is equal to or lower than the upper limit angular velocity ωlim, the excess angular velocity computation unit 84 outputs the excess angular velocity ωo indicating zero, to the velocity limit component computation unit 85.

Specifically, the excess angular velocity computation unit 84 includes a minimum value selection unit 92 that receives the upper limit angular velocity ωlim and the steering velocity ωs. The minimum value selection unit 92 selects the smaller one of the upper limit angular velocity ωlim and the absolute value of the steering velocity ωs, and outputs the smaller one to a subtracter 93. Then, with the subtracter 93, the excess angular velocity computation unit 84 computes the excess angular velocity ωo by subtracting the output value of the minimum value selection unit 92 from the absolute value of the steering velocity ωs. In the case where the absolute value of the steering velocity ωs is equal to or smaller than the upper limit angular velocity ωlim in the selection of the smaller one of the upper limit angular velocity ωlim and the absolute value of the steering velocity ωs by the minimum value selection unit 92, the steering velocity ωs is subtracted from the steering velocity ωs by the subtracter 93, so that the excess angular velocity ωo becomes zero. On the other hand, in the case where the absolute value of the steering velocity ωs is larger than the upper limit angular velocity ωlim, the upper limit angular velocity ωlim is subtracted from the absolute value of the steering velocity ωs by the subtracter 93, so that the excess of the steering velocity ωs relative to the upper limit angular velocity ωlim is the excess angular velocity ωo.

The velocity limit component computation unit 85 receives the excess angular velocity ωo and the vehicle speed SPD. The velocity limit component computation unit 85 includes a map deciding a relation of the excess angular velocity ωo, the vehicle speed SPD and the velocity limit component Igs, and computes the velocity limit component Igs corresponding to the excess angular velocity ωo and the vehicle speed SPD, by referring to the map.

In the map, the velocity limit component Igs is set such that the velocity limit component Igs is smallest when the excess angular velocity ωo is zero and the velocity limit component Igs increases in proportion to increase in the excess angular velocity ωo. Further, in the map, the velocity limit component Igs is set so as to decrease based on increase in the vehicle speed SPD. In the map, the absolute value of the velocity limit component Igs is set so as to be smaller than the absolute value of the angle limit component Iga. The velocity limit component Igs computed in this way is output to a subtracter 87.

The rated current Ir is input to the subtracter 86 that receives the angle limit component Iga' after the above correction. The steer angle limit value computation unit 71 outputs a value resulting from subtracting the angle limit component Iga' after the correction from the rated current Ir with the subtracter 86, to the subtracter 87 that receives the velocity limit component Igs. Then, the steer angle limit value computation unit 71 outputs a value resulting from subtracting the velocity limit component Igs from the output value of the subtracter 86 with the subtracter 87, that is, a value resulting from subtracting the angle limit component Iga' after the correction and the velocity limit component Igs from the rated current Ir, to the minimum value selection unit 73, as the steer angle limit value Ien.

Next, the configuration of the release control unit 83 will be described. When movement of the rack shaft 12 is restricted at a virtual rack end position on a steering neutral position side of an actual rack end position due to the execution of the end-abutting relaxation control, the small-slewing performance of the vehicle can decrease. In view of this point, when the driver intends to perform slewing travel, the release control unit 83 allows the rack shaft 12 to move to the actual rack end position, by executing a partial release control to reduce the correction amount of the q-axis current command value Iq* in the execution of the end-abutting relaxation control, that is, to partially release the limitation of the q-axis current command value Iq*.

As described above, the guard processing unit 63 limits the absolute value of the q-axis current command value Iq* to a value that is equal to or smaller than the limit value Ig. Therefore, as the steer angle limit value Ien as the limit value Ig is larger, the correction amount of the q-axis current command value Iq* is smaller. The steer angle limit value Ien is computed by subtracting the angle limit component Iga' after the correction and the velocity limit component Igs from the rated current Ir. Therefore, as the angle limit component Iga' is smaller, the steer angle limit value Ien is larger and the correction amount of the q-axis current command value Iq* is smaller. In light of this point, when the driver intends to perform the slewing travel of the vehicle during the execution of the end-abutting relaxation control, the release control unit 83 in the embodiment performs the correction such that the input angle limit component Iga decreases, and thereby executes the partial release control to reduce the correction amount of the q-axis current command value Iq* in the execution of the end-abutting relaxation control.

More specifically, the release control unit 83, in addition to the angle limit component Iga, receives the vehicle speed SPD, the steering torque Th, and a motor angular velocity ωm obtained by differentiating the rotation angle θm. Based on the state quantities, the release control unit 83 performs a slewing intention determination of whether the driver intends to perform the slewing travel of the vehicle by performing the additional steering or keeping the steering state during the execution of the end-abutting relaxation control. Then, when it is determined that the driver intends to perform the slewing travel, the release control unit 83 corrects the angle limit component Iga such that the angle limit component Iga decreases, and outputs the angle limit component Iga' after the correction, to the subtracter 86.

Figure 5:
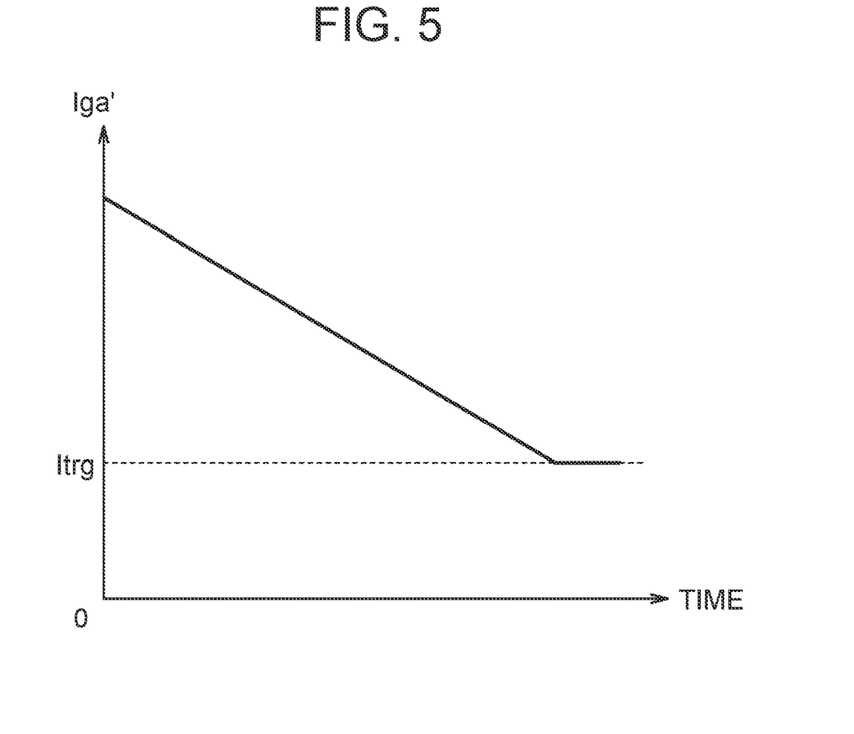
FIG. 5 is a graph showing a temporal change in an angle limit component after correction in the embodiment.

As shown in FIG. 5, the release control unit 83 performs computation during the execution of the partial release control, such that the angle limit component Iga' after the correction is gradually reduced to a release target value Itrg. Specifically, the release control unit 83 linearly reduces the angle limit component Iga such that the angle limit component Iga' after the correction becomes the release target value Itrg, with time lapse from the start time of the partial release control.

The release target value Itrg is set such that, when the angle limit component Iga' after the correction becomes the release target value Itrg, a predetermined assist force allowing the rack shaft 12 to move to the rack end position is given from the motor 21, for example, in the case where the vehicle travels on a normal road surface at low speed. In other words, the absolute value of the steer angle limit value Ien obtained by subtracting the release target value Itrg and the velocity limit component Igs from the rated current Ir has such a magnitude that the predetermined assist force is output from the motor 21 by the supply of the electric current to the motor 21. The release target value Itrg is a current value based on the rated current Ir, and is set to 50% of the rated current Ir, for example.

After the execution of the partial release control, the release control unit 83 stops the partial release control, when the angle limit component Iga before the correction based on the end interval angle $\Delta\theta$ becomes smaller than the release target value Itrg, for example, by driver's return steering. That is, the release control unit 83 outputs the input angle limit component Iga, with no change, as the angle limit component Iga' after the correction, and does not change the correction amount in the execution of the end-abutting relaxation control.

When it is determined that the driver does not intend to perform the slewing travel during the execution of the end-abutting relaxation control, the release control unit 83 outputs the input angle limit component Iga, with no change, as the angle limit component Iga' after the correction. That is, when it is determined that the driver does not intend to the slewing travel, the release control unit 83 does not execute the partial release control.

More specifically, the release control unit 83 determines that the driver intends to perform the slewing travel of the vehicle during the execution of the end-abutting relaxation control, when a condition for the slewing intention determination that is constituted by (a) to (e) described below is continuously satisfied for a predetermined time. The predetermined time is set to an appropriate time allowing the determination that the driver is performing the additional steering or is keeping the steering state.

(a) The angle limit component Iga is larger than a current threshold Ith.

(b) The absolute value of the steering torque Th is equal to or larger than a steering torque threshold Tth.

(c) The vehicle speed SPD is in a predetermined vehicle speed range.

(d) The absolute value of the motor angular velocity wm is equal to or smaller than an angular velocity threshold wth.

(e) The absolute value of an angular velocity change amount $\Delta\omega$m that is the change amount of the motor angular velocity $\omega$m is smaller than an angular velocity change amount threshold $\Delta\omega$th.

For the determination condition (e), the release control unit 83 computes the angular velocity change amount $\Delta\omega$m that is the change amount of the motor angular velocity $\omega$m, based on the input motor angular velocity $\omega$m, and uses the computed angular velocity change amount $\Delta\omega$m subjected to a low-pass filter process.

The current threshold Ith is a current value based on the rated current Ir, and is set to the same value as the above release target value Itrg, in the embodiment. The steering torque threshold Tth is a steering torque necessary to keep the steering wheel 3 for the slewing travel of the vehicle in the state where the rack end 18 abuts on the rack housing 13, and is set to an appropriate value that is larger than zero. The predetermined vehicle speed range indicates a vehicle speed range of equal to or higher than a lower limit vehicle speed Slo and lower than an upper limit vehicle speed Sup. The lower limit vehicle speed Slo indicates that the vehicle is not in a stop state, and the upper limit vehicle speed Sup indicates that the vehicle is traveling at low speed. The lower limit vehicle speed Slo is set to a value that is slightly higher than zero, and the upper limit vehicle speed Sup is set to an appropriate value that is higher than the lower limit vehicle speed Slo. The angular velocity threshold wth is an angular velocity indicating the stop of the motor 21, and is set to a value that is slightly higher than zero. The angular velocity change amount threshold $\Delta\omega$th is an angular velocity change amount indicating that the motor 21 roughly neither accelerates nor decelerates, and is set to a value that is slightly larger than zero.

Figure 4:
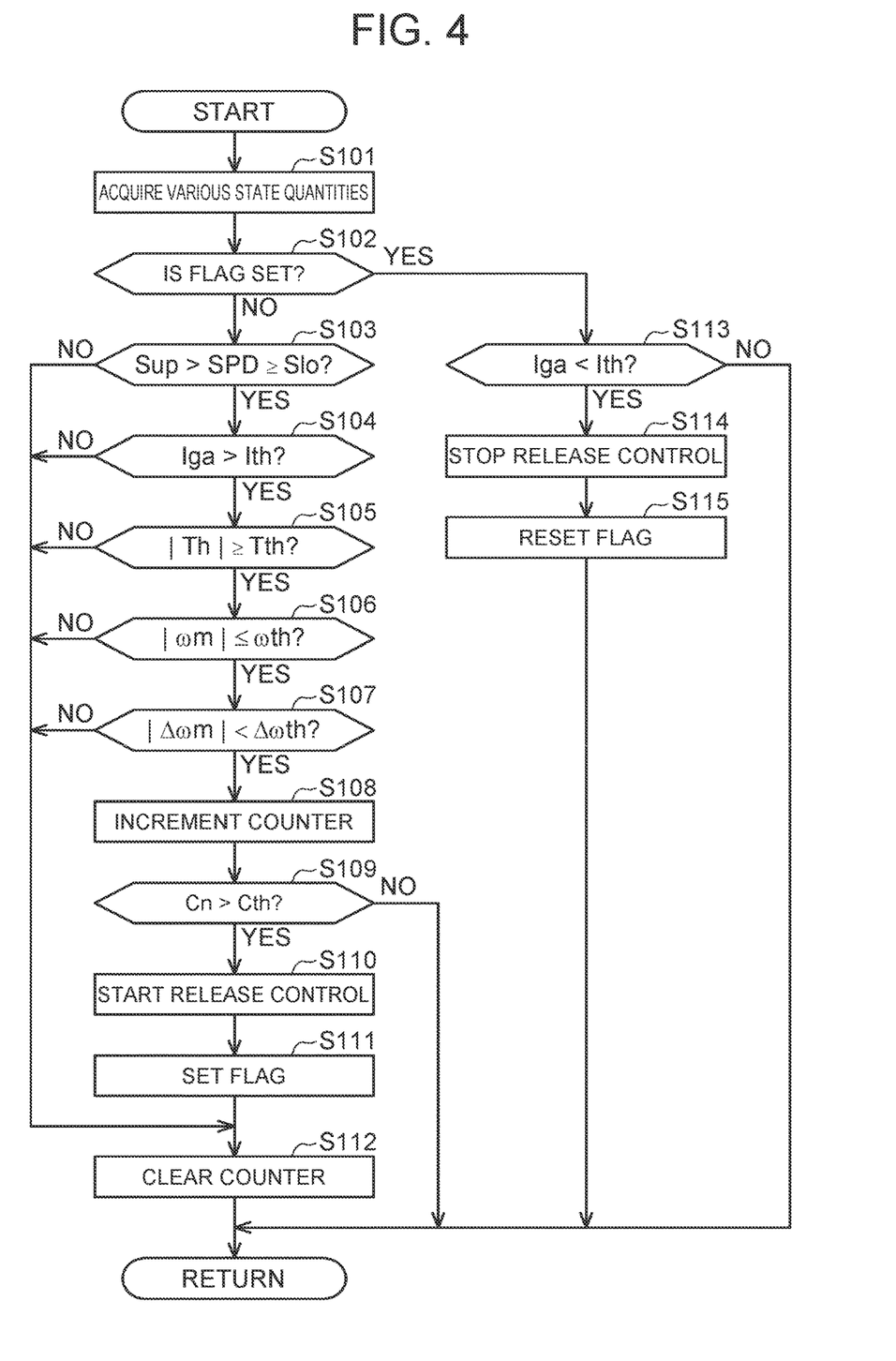
FIG. 4 is a flowchart showing a processing procedure of execution and stop of a partial release control by a release control unit in the embodiment.

Specifically, as shown in a flowchart of FIG. 4, the release control unit 83 acquires various state quantities (step 101), and then determines whether a flag indicating that the partial release control is being executed is set (step 102).

In the case where the flag is not set (step 102: NO), the release control unit 83 determines whether the vehicle speed SPD is equal to or higher than the lower limit vehicle speed Slo and is lower than the upper limit vehicle speed Sup (step 103). In the case where the vehicle speed SPD is equal to or higher than the lower limit vehicle speed Slo and is lower than the upper limit vehicle speed Sup and is in the predetermined vehicle speed range (step 103: YES), the release control unit 83 determines whether the angle limit component Iga is larger than the current threshold Ith (step 104). In the case where the angle limit component Iga is larger than the current threshold Ith (step 104: YES), the release control unit 83 determines whether the absolute value of the steering torque Th is equal to or larger than the steering torque threshold Tth (step 105). In the case where the absolute value of the steering torque Th is equal to or larger than the steering torque threshold Tth (step 105: YES), the release control unit 83 determines whether the absolute value of the motor angular velocity wm is equal to or smaller than the angular velocity threshold wth (step 106). In the case where the absolute value of the motor angular velocity $\omega$m is equal to or smaller than the angular velocity threshold wth (step 106: YES), the release control unit 83 determines whether the angular velocity change amount $\Delta\omega$m is smaller than the angular velocity change amount threshold $\Delta\omega$th (step 107). In the case where the angular velocity change amount $\Delta\omega$m is smaller than the angular velocity change amount threshold $\Delta\omega$th (step 107: YES), the release control unit 83 transitions to step 108.

In step 108, the release control unit 83 increments a count value Cn of a counter indicating a time that has lapsed since the determination in steps 103 to 107, that is, the satisfaction of the conditions (a) to (e). Subsequently, the release control unit 83 determines whether the count value Cn is larger than a predetermined count value Cth corresponding to the predetermined time (step 109). In the case where the count value Cn is larger than the predetermined count value Cth (step 109: YES), the release control unit 83 starts the partial release control (step 110), sets the flag (step 111), and clears the count value Cn of the counter (step 112).

In the case where the count value Cn is equal to or smaller than the predetermined count value Cth (step 109: NO), the release control unit 83 does not execute the processes after that. Further, in the case where one of steps 103 to 107 is not satisfied (steps 103 to 107: NO), the release control unit 83 does not execute the processes in steps 108 to 111, and transitions to step 112 to clear the count value Cn.

On the other hand, in the case where the flag is set (step 102: YES), the release control unit 83 determines whether the angle limit component Iga computed based on the end interval angle $\Delta\theta$ is smaller than the release target value Itrg, that is, the current threshold Ith (step 113). In the case where the angle limit component Iga is smaller than the release target value Itrg (step 113: YES), the release control unit 83 stops the partial release control (step 114), and resets the flag (step 115). In the case where the angle limit component Iga is equal to or larger than the release target value Itrg (step 113: NO), the release control unit 83 does not execute the processes after that.

Next, the operation and effect of the embodiment will be described.

When it is determined that the driver intends to perform the slewing travel of the vehicle during the execution of the end-abutting relaxation control, the release control unit 83 performs the partial release control to reduce the correction amount of the q-axis current command value Iq* in the execution of the end-abutting relaxation control. Thereby, the limitation of the q-axis current command value Iq* by the execution of the end-abutting relaxation control is partially released, and the q-axis current command value Iq* increases. Accordingly, for example, even when the movement of the rack shaft 12 is restricted at the virtual rack end position due to the execution of the end-abutting relaxation control, the partial release control is executed and the q-axis current command value Iq* increases because of the driver's intention to perform the slewing travel. Therefore, it is possible to move the rack shaft 12 to the actual rack end position. As a result, it is possible to restrain the decrease in the small-slewing performance of the vehicle.

The current command value computation unit 51 includes the steer angle limit value computation unit 71 that computes the steer angle limit value Ien that decreases based on the decrease in the end interval angle Δθ when the end interval angle Δθ is equal to or smaller than the predetermined angle θ1, and the limit value setting unit 62 that sets the limit value Ig to the value that is equal to or smaller than the steer angle limit value Ien. The current command value computation unit 51 executes the end-abutting relaxation control by limiting the absolute value of the q-axis current command value Iq* to the steer angle limit value Ien. The steer angle limit value computation unit 71 computes, as the steer angle limit value Ien, the value resulting from subtracting the angle limit component Iga' and the velocity limit component Igs from the rated current Ir. The release control unit 83 reduces the angle limit component Iga during the execution of the partial release control. Accordingly, with the embodiment, in the configuration of executing the end-abutting relaxation control in the manner in which the q-axis current command value Iq* is limited to the value that is equal to or smaller than the steer angle limit value Ien, it is possible to easily execute the partial release control to reduce the correction amount of the q-axis current command value Iq* by reducing the angle limit component Iga that is a base of the steer angle limit value Ien.

The release control unit 83 determines that the driver intends to perform the slewing travel of the vehicle during the execution of the end-abutting relaxation control, when the conditions (a) to (e) are continuously satisfied for the predetermined time. Therefore, it is possible to more exactly determine the situation in which the driver intends to perform the slewing travel while performing the additional steering or keeping the steering state in the state where the movement of the rack shaft 12 is restricted at the virtual rack end position due to the execution of the end-abutting relaxation control.

The release control unit 83 linearly reduces the angle limit component Iga, with time lapse from the start time of the partial release control. Therefore, it is possible to suitably increase the steer angle limit value Ien, and furthermore it is possible to suitably increase the q-axis current command value Iq*. Thereby, for example, even when the rack shaft 12 is moved by the execution of the partial release control and the end abutting occurs, it is possible to restrain a great load from being given to the EPS 2 at the time of the end abutting.

The release control unit 83 stops the partial release control, when the return steering is performed after the execution of the partial release control and the angle limit component Iga before the reduction by the execution of the partial release control, that is, the angle limit component Iga before the correction becomes smaller than the release target value Itrg. Therefore, for example, unlike the case of stopping the partial release control in a state where the angle limit component Iga before the reduction by the execution of the partial release control is equal to or larger than the release target value Itrg, it is possible to prevent the steer angle limit value Ien, that is, the q-axis current command value Iq* from changing suddenly, and to restrain a steering feeling from being worsened.

The embodiment can be carried out while being modified as follows. The embodiment and the following modifications can be carried out while being mutually combined as long as there is no technical inconsistency.

In the above embodiment, the angle limit component Iga' after the correction is linearly reduced with time lapse from a start time of the partial release control. However, without being limited to this, the manner in which the angle limit component Iga is reduced can be appropriately modified.

Figure 6:
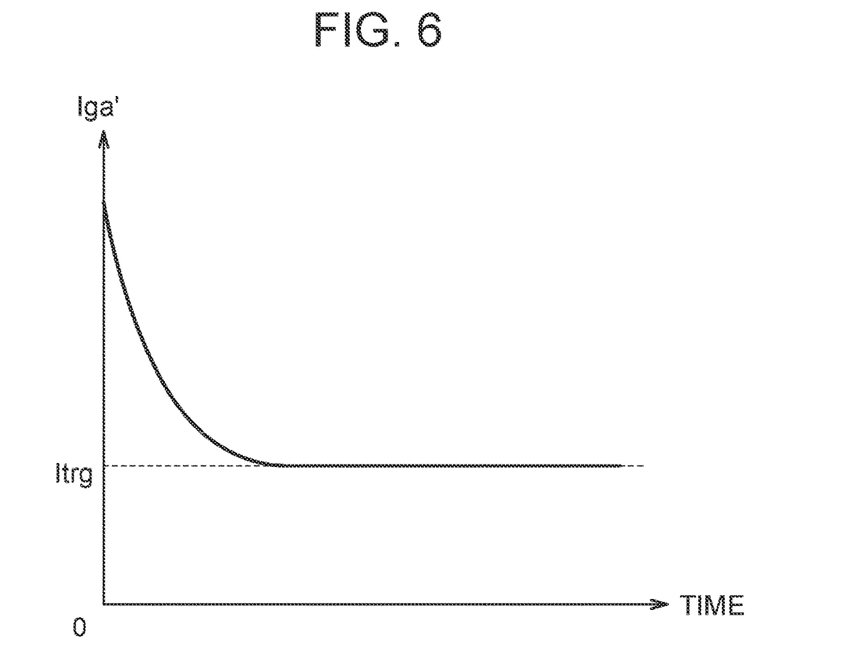
FIG. 6 is a graph showing a temporal change in the angle limit component after correction in a modification.

For example, as shown in FIG. 6, with time lapse from the start time of the partial release control, it is allowable to reduce the angle limit component Iga' after the correction to the release target value Itrg, while reducing the absolute value of the change rate of the angle limit component Iga' after the correction with respect to the time lapse. This configuration can also exert the same operation and effect as those of the above embodiment. Further, with time lapse from the start time of the partial release control, it is allowable to reduce the angle limit component Iga in stages, or it is allowable to immediately reduce the angle limit component Iga to the release target value Itrg.

In the above embodiment, the release target value Itrg is set to the same value as the current threshold Ith. However, without being limited to this, the release target value Itrg may be set to a value that is larger than the current threshold Ith, for example.

In the above embodiment, the partial release control is stopped when the angle limit component Iga before the reduction by the execution of the partial release control becomes smaller than the release target value Itrg after the execution of the partial release control. However, without being limited to this, even when the angle limit component Iga is equal to or larger than the release target value Itrg, the partial release control may be stopped, for example, when one of the conditions (a) to (e) is not satisfied.

In the above embodiment, it is determined that the driver intends to perform the slewing travel of the vehicle during the execution of the end-abutting relaxation control, when the conditions (a) to (e) are continuously satisfied for the predetermined time. However, without being limited to this, the condition for the determination can be appropriately modified. For example, it may be determined that the driver intends to perform the slewing travel of the vehicle, when the conditions (a) to (e) are satisfied, regardless of whether the satisfaction continues for the predetermined time. Further, for example, for one of the conditions (d) and (e), it is not necessary to determine whether the condition is satisfied, and furthermore, for example, it is allowable to determine whether the yaw rate of the vehicle is equal to or higher than a yaw rate threshold indicating the slewing state, instead of the condition (c). Moreover, in the conditions (d) and (e), it is allowable to use the steering velocity ωs instead of the motor angular velocity ωm.

In the above embodiment, when it is determined that the driver intends to perform the slewing travel of the vehicle during the execution of the end-abutting relaxation control, the steering control device 1 reduces the correction amount of the q-axis current command value Iq* by correcting the angle limit component Iga such that the angle limit component Iga decreases. However, without being limited to this, the manner of the partial release control can be appropriately modified. For example, it is allowable to reduce the correction amount of the q-axis current command value Iq* by correcting the steer angle limit value Ien such that the steer angle limit value Ien increases.

In the above embodiment, by monitoring whether the motor 21 rotates even while the ignition switch is in the off-state, the steering control device 1 adds up the rotation number of the motor 21 from the starting point at all times, and computes the motor absolute angle. However, without being limited to this, for example, the steering control device 1 may be provided with a steering sensor that detects the steering angle as an absolute angle. The steering control device 1 may add up the rotation number of the motor 21 from the starting point, based on the steering angle detected by the steering sensor and the reduction ratio of the speed reducer 22, and may compute the motor absolute angle.

In the above embodiment, the steering control device 1 executes the end-abutting relaxation control, by limiting the assist command value Ias* to the steer angle limit value Ien. However, without being limited to this, for example, the steering control device 1 may execute the end-abutting relaxation control, by adding, to the assist command value Ias*, a steering reaction component that is larger as the rack shaft 12 approaches the rack end position, that is, a component that has a sign opposite to the sign of the assist command value Ias*. In this configuration, when it is determined that the driver intends to perform the slewing travel of the vehicle during the execution of the end-abutting relaxation control, it is possible to reduce the correction amount of the q-axis current command value Iq* by reducing the steering reaction component.

In the above embodiment, the steering control device 1 performs the guard process to the assist command value Ias*. However, without being limited to this, for example, the steering control device 1 may perform the guard process for a value resulting from correcting the assist command value Ias* with a compensation amount based on a torque differential value resulting from differentiating the steering torque Th.

In the above embodiment, the limit value setting unit 62 includes the voltage limit value computation unit 72 that computes the voltage limit value Ivb based on the source voltage Vb. However, without being limited to this, the limit value setting unit 62 may include another computation unit that computes another limit value based on another state quantity, in addition to or instead of the voltage limit value computation unit 72. Further, the limit value setting unit 62 may be configured to set the steer angle limit value Ien itself as the limit value Ig, without including the voltage limit value computation unit 72.

In the above embodiment, the steer angle limit value Ien may be a value resulting from subtracting only the angle limit component Iga from the rated current Ir.

In the above embodiment, the steering control device 1 controls the EPS 2, which is a type of steering device in which the EPS actuator 6 gives the motor torque to the column shaft 15. However, without being limited to this, for example, the steering control device 1 may control a type of steering device that gives the motor torque to the rack shaft 12 through a ball screw nut. Further, without being limited to the EPS, the steering control device 1 may control a steer-by-wire steering device in which dynamic power is not transmitted between a steering unit that is operated by the driver and a turning unit that turns turning wheels, and may execute the end-abutting relaxation control in the embodiment, for a torque command value or q-axis current command value of a motor of a turning actuator provided in the turning unit.

What is claimed is:

1. A steering control device comprising a control circuit that controls a steering device, the steering device including a housing, a turning shaft contained in the housing so as to be capable of reciprocating, and an actuator configured to give motor torque by which the turning shaft reciprocates using a motor as a drive source, the control circuit being configured to detect an absolute steer angle that is indicated by an absolute angle having a range beyond 360°, the absolute steer angle being a rotation angle of a rotation shaft and being capable of being converted into a turning angle of a turning wheel that is coupled to the turning shaft, the control circuit being configured to compute a current command value corresponding to a target value of the motor torque to be output by the motor, the control circuit being configured to control driving of the motor such that an actual current value of electric current to be supplied to the motor becomes the current command value, the control circuit being configured to store an end position correspondence angle associated with the absolute steer angle, the end position correspondence angle being an angle indicating an end position where movement of the turning shaft is restricted by end abutting in which the turning shaft abuts on the housing, the control circuit being configured to execute an end-abutting relaxation control to correct the current command value such that decrease in an end interval angle is restricted, when the end interval angle is equal to or smaller than a predetermined angle, the end interval angle indicating a distance of the absolute steer angle from the end position correspondence angle, the control circuit being configured to perform a slewing intention determination of whether it is intended to perform slewing travel of a vehicle during the execution of the end-abutting relaxation control, and being configured to perform a partial release control to reduce a correction amount of the current command value in the execution of the end-abutting relaxation control when it is determined that it is intended to perform the slewing travel of the vehicle.

2. The steering control device according to claim 1, wherein:

the control circuit is configured to compute a steer angle limit value that decreases based on the decrease in the end interval angle, when the end interval angle is equal to or smaller than the predetermined angle;

the control circuit is configured to set a limit value that is an upper limit of an absolute value of the current command value, to a value that is equal to or smaller than the steer angle limit value;

the control circuit is configured to execute the end-abutting relaxation control by limiting the absolute value of the current command value to the steer angle limit value;

the control circuit is configured to compute the steer angle limit value based on a value resulting from subtracting an angle limit component from a rated current of the motor, the angle limit component being based on the end interval angle; and the control circuit is configured to execute the partial release control by reducing the angle limit component.

3. The steering control device according to claim 2, wherein a condition for satisfaction of the slewing intention determination includes a condition that the angle limit component is larger than a current threshold that is set based on the rated current, and a condition that a steering torque to be input to the steering device is equal to or larger than a steering torque threshold indicating a torque necessary for the slewing travel of the vehicle.

4. The steering control device according to claim 3, wherein the condition for the satisfaction of the slewing intention determination includes a condition that a vehicle speed is in a predetermined vehicle speed range indicating a low speed range.

5. The steering control device according to claim 3, wherein the condition for the satisfaction of the slewing intention determination includes at least one of a condition that an angular velocity of the motor is equal to or lower than an angular velocity threshold indicating a stop state of the motor and a condition that an angular velocity change amount of the motor is smaller than an angular velocity change amount threshold indicating the stop state of the motor.

6. The steering control device according to claim 3, wherein the control circuit is configured to determine that it is intended to perform the slewing travel of the vehicle, when the slewing intention determination is continuously satisfied for a predetermined time.

7. The steering control device according to claim 2, wherein the control circuit is configured to linearly reduce the angle limit component, with time lapse from a start time of the partial release control.

8. The steering control device according to claim 2, wherein the control circuit is configured to reduce an absolute value of a change rate of the angle limit component and reduce the angle limit component, with time lapse from a start time of the partial release control, the change rate of the angle limit component being a change rate with respect to the time lapse.

9. The steering control device according to claim 2, wherein:

the control circuit is configured to reduce the angle limit component until the angle limit component becomes a preset release target value, during the execution of the partial release control; and the control circuit is configured to stop the partial release control when the angle limit component before the reduction by the execution of the partial release control is smaller than the preset release target value.

\* \* \* \* \*

UNITED STATES PATENT AND TRADEMARK OFFICE
CERTIFICATE OF CORRECTION

| | | |
|---|---|---|
| PATENT NO. | : 11,167,790 B2 | Page 1 of 1 |
| APPLICATION NO. | : 17/013957 | |
| DATED | : November 9, 2021 | |
| INVENTOR(S) | : Kataoka et al. | |

It is certified that error appears in the above-identified patent and that said Letters Patent is hereby corrected as shown below:

On the Title Page

Item (73), correct the assignee to read:
(73) Assignee: JTEKT CORPORATION, Osaka, JP Signed and Sealed this
Seventh Day of February, 2023

Katherine Kelly Vidal
*Director of the United States Patent and Trademark Office*